United States Patent [19]
Kobayashi et al.

[11] Patent Number: 5,543,444
[45] Date of Patent: Aug. 6, 1996

[54] RED PHOSPHORUS FLAME RETARDANT AND NONFLAMMABLE RESINOUS COMPOSITION

[75] Inventors: Tsuyoshi Kobayashi; Ichiro Sakon; Shigeo Nakashima; Sachiko Numa; Yoshikazu Inao, all of Toyama, Japan

[73] Assignee: Rinkagaku Kogyo Co., Ltd., Toyama, Japan

[21] Appl. No.: 287,937

[22] Filed: Aug. 9, 1994

[30] Foreign Application Priority Data

Aug. 12, 1993 [JP] Japan .................................. 5-220671

[51] Int. Cl.$^6$ .......................... C08K 3/32; C08K 3/20; B32B 9/04
[52] U.S. Cl. .......................... 523/205; 428/407; 523/200; 523/204; 524/414; 524/80; 423/322
[58] Field of Search .......................... 523/200, 204, 523/205; 524/414, 80; 428/407; 423/322

[56] References Cited

U.S. PATENT DOCUMENTS

| | | | |
|---|---|---|---|
| 2,635,953 | 4/1953 | Silverstein et al. | 423/322 |
| 4,145,369 | 3/1979 | Hira et al. | 523/205 |
| 4,242,240 | 12/1980 | Cerny et al. | 260/14 |
| 4,315,897 | 2/1982 | Staendoke et al. | 423/274 |
| 4,421,428 | 12/1983 | Twardowska | 423/265 |
| 4,440,880 | 4/1984 | Albanesi et al. | 523/205 |
| 4,559,372 | 12/1985 | Giroud-Abel | 523/205 |
| 4,853,288 | 8/1989 | Staendeke et al. | 408/402.24 |
| 4,879,067 | 11/1989 | Sakon et al. | 252/609 |
| 5,026,757 | 6/1991 | Sakon et al. | 524/414 |
| 5,041,490 | 8/1991 | Sakon et al. | 524/414 |
| 5,292,494 | 3/1994 | Inao et al. | 423/322 |

FOREIGN PATENT DOCUMENTS

| | | |
|---|---|---|
| 1282576 | 4/1991 | Canada . |
| 0176834 | 4/1986 | European Pat. Off. . |
| 0195131 | 9/1986 | European Pat. Off. . |
| 0249723 | 12/1987 | European Pat. Off. . |
| 0283759 | 9/1988 | European Pat. Off. . |
| 0296501 | 12/1988 | European Pat. Off. ............ 523/205 |
| 0490110 | 6/1992 | European Pat. Off. . |
| 54-39200 | 11/1979 | Japan ............................ C01B 25/00 |
| 2021704 | 1/1987 | Japan ............................ 428/407 |

OTHER PUBLICATIONS

Miller, "Performance Moves Up on R&D's Hit List", Plastic World, Mar. 1992, pp. 42–48.
Encyclopedia of Chemical Terminology, vol. 15, p. 286 (1968).

*Primary Examiner*—Paul R. Michl
*Assistant Examiner*—Andrew E. C. Merriam
*Attorney, Agent, or Firm*—Sughrue, Mion, Zinn, Macpeak & Seas

[57] ABSTRACT

Disclosed is a red phosphorus flame retardant comprising a fine red phosphorus powder subjected to a surface modification treatment, said fine red phosphorus powder consisting of spherical red phosphorus particles and/or agglomerates thereof directly obtained by the thermal conversion of white phosphorus in the presence of a dispersant and has an average particle size of 10 μm or smaller and of which at least 80% by weight is accounted for by particles having particle sizes of 20 μm or smaller, said flame retardant having an average particle size of 15 μm or smaller, with the particles having particle sizes of 35 μm or smaller accounting for at least 80% by weight of the flame retardant; and a nonflammable resinous composition composed of a synthetic resin and the red phosphorus flame retardant.

17 Claims, No Drawings

RED PHOSPHORUS FLAME RETARDANT AND NONFLAMMABLE RESINOUS COMPOSITION

FIELD OF THE INVENTION

The present invention relates to a red phosphorus flame retardant in fine powder form and a nonflammable resinous composition flameproofed with the flame retardant and having improved stability.

BACKGROUND OF THE INVENTION

Red phosphorus is known as a flame retardant for synthetic resins. Red phosphorus flame retardants produced by the surface modification treatment of powdered red phosphorus with various kinds of inorganic or organic compounds and nonflammable resinous compositions containing these flame retardants are known in a large number. Disclosed in U.S. Pat. Nos. 4,242,240, 4,315,897, 4,421,728, and 4,440,880 respectively are a red phosphorus flame retardant treated with a phenol-formaldehyde polycondensate, one treated with aluminum hydroxide and an epoxy resin, one treated with titanium dioxide or titanium phosphate, and one treated with a melamine condensate. The surface modification treatment is conducted in order to improve the chemical stability of red phosphorus and improve the usefulness thereof as a flame retardant.

As is well known, red phosphorus is an unstable substance and undergoes a disproportionation reaction with moisture and oxygen to decompose and thus generate phosphine, which is harmful to the human body. It is further known that the decomposition products other than phosphine adversely affect properties of the flameproofed resin and corrode the mold for use in molding the resin.

The surface modification treatment serves to reduce the generation of such harmful substances by coating the surfaces of the red phosphorus particles with a chemically stable inorganic or organic compound to inhibit the disproportionation reaction.

One of the reasons for the instability of powdered red phosphorus is the shape of the red phosphorus particles which is attributable to the process for the production thereof. The powdered red phosphorus on the market is obtained by heating white phosphorus (the terms "white phosphorus" and "yellow phosphorus" are used interchangeably) in a closed vessel for a long time to convert it into red phosphorus and wet-grinding the resulting solid mass of red phosphorus after completion of the conversion reaction, as described in Kirk-Othmer, "Encyclopedia of Chemical Technology" 2nd Ed., John Wiley & Sons, Inc., New York, 1968, Vol. 15, p.286. Since the pulverizing step is indispensable and the contour of each particle of the powdered red phosphorus is constituted by split-off surfaces having many active sites, the particles are so reactive that the disproportionation reaction and the generation of harmful substances are more accelerated. The red phosphorus flame retardants according to the prior art techniques described above are ones obtained by the surface modification treatment of such red phosphorus powdered by pulverizing.

With recent progress in processes for producing synthetic resin articles and in the character thereof, there is a desire for an inorganic compound flame retardant which is finer and has a narrow distribution of particle size. Such flame retardants are being developed with respect to aluminum hydroxide, boric acid salts, magnesium compounds, molybdenum compounds, antimony trioxide, etc. (Plast. World, 1992, Cahners Publ., Boston Mass., 50(3), p.42.)

The same desire is required of red phosphorus flame retardants, but it has not been realized. This is because the conventional red phosphorus flame retardants produced by surface treatment of finely pulverized red phosphorus are insufficient in stability and unable to meet the requirements of the market, by reason that pulverizing reduces the chemical stability of red phosphorus as described above.

In U.S. Pat. No. 4,879,067 is disclosed a red phosphorus flame retardant based on stable spherical red phosphorus particles having no split-off surfaces. The spherical red phosphorus particles are produced by a process not including a pulverizing step, and there is a description to the effects that the contour of each red phosphorus particle is almost free from a split-off surface and that a more stable flame retardant is obtained from this red phosphorus than that obtained from pulverized red phosphorus.

SUMMARY OF THE INVENTION

This invention is concerned with a red phosphorus flame retardant in fine powder form which is stable and has regulated particle sizes and which is obtained by a surface treatment of fine spherical red phosphorus particles produced by a specific process and having regulated particle sizes. That is, the present invention provides a red phosphorus flame retardant produced by a surface modification treatment of a fine red phosphorus powder. Specifically, the fine red phosphorus powder consists of spherical red phosphorus particles and/or agglomerates thereof directly obtained by the thermal conversion of white phosphorus in the presence of a dispersant and has an average particle size of 10 µm or smaller and of which at least 80% by weight is accounted for by particles having particle sizes of 20 µm or smaller, said flame retardant having an average particle size of 15 µm or smaller, with the particles having particle sizes of 35 µm or smaller accounting for at least 80% by weight of the flame retardant. This invention further provides a nonflammable resinous composition flameproofed with the flame retardant. Since the red phosphorus flame retardant of this invention is produced from fine spherical red phosphorus particles which, unlike pulverized red phosphorus, are not subject to the disproportionation reaction accelerated by the presence of split-off surfaces, it shows good stability despite its fine powder form. In addition, since the reactivity inherent in red phosphorus is reduced by the surface modification treatment, the flame retardant of the invention is less affected by environmental factors and hence retains the stability over a long period of time.

GENERAL DESCRIPTION OF THE INVENTION

The red phosphorus to be used for producing the red phosphorus flame retardant of this invention is a fine red phosphorus powder consisting of spherical red phosphorus particles which have an average particle size of 10 µm or smaller and of which at least 80% by weight are accounted for by fine particles having particle sizes of 20 µm or smaller.

Since such fine spherical red phosphorus particles are obtained directly as a powder by heating white phosphorus at a temperature near the boiling point thereof in the presence of a dispersant to thermally convert the white phosphorus to red phosphorus, there is no need of pulverizing for particle size reduction. Preferred examples of the dispersant include various surfactants, inorganic ammonium salts, and organic compounds containing an amino group. Other usable examples thereof include substances which serve to enhance the dispersibility of red phosphorus particles generated in molten white phosphorus and to inhibit the agglomeration of the particle. The sizes of red phosphorus particles yielded vary depending on the amount of the dispersant added and on conversion ratio from white phosphorus to red phosphorus. Usually, spherical red phosphorus particles having an average particle size of several micrometers to several tens of micrometers are obtained when a dispersant is added in an amount of 0.1 to 2% by weight of white phosphorus and the conversion ratio is 70% by weight or lower. Of the spherical red phosphorus particles thus yielded, fine particles which have an average particle size of 10 μm or smaller and of which at least 80% by weight are accounted for by particles of 20 μm or smaller are subjected to a surface modification treatment. Then, the resulting red phosphorus flame retardant in fine powder form of the present invention obtained by the surface treatment has an average particle size of 15 μm or smaller and of which at least 80% by weight is accounted for by particles of 35 μm or smaller.

As the surface modification treatment, any of the conventional methods for coating with various inorganic compounds or synthetic resins is applicable.

An inorganic compound is selected from the metal oxides or hydroxides of the Groups II, III, and IV of the Periodic Table. Specific examples thereof include aluminum hydroxide, magnesium hydroxide, zinc hydroxide, and titanium oxide. The fine spherical red phosphorus particles are suspended in an aqueous solution of a water-soluble salt selected from the above-enumerated metals and a coating layer is deposited on the red phosphorus particles by a reaction with sodium hydroxide, ammonium bicarbonate, etc. In this treatment, the amount of the red phosphorus in its aqueous suspension is preferably from 10 to 100 parts by weight per 100 parts by weight of the water, the concentration of the water-soluble metal salt in its aqueous solution is preferably from 5 to 30% by weight, and the amount of the hydroxide or oxide to be deposited for coating is preferably from 1 to 30 parts by weight per 100 parts by weight of the red phosphorus. Although an excellent red phosphorus flame retardant is thus obtained, the present invention is not particularly limited thereto.

The coating of the fine spherical red phosphorus particles with a thermosetting resin is then explained. Any starting material for the resin or any precondensate thereof may be used as a material for the thermosetting resin as long as the starting material readily undergoes polymerization reaction in the aqueous suspension of red phosphorus or the precondensate is emulsifiable and dispersible in water and homogeneously deposits on and covers the surfaces of the red phosphorus particles. The thermosetting resin is usually selected from phenolic resins, furan resins, xylene-formaldehyde resins, ketone-formaldehyde resins, urea resins, melamine resins, aniline resins, alkyd resins, unsaturated polyester resins, epoxy resins, and the like. Although the conditions for the coating treatment vary in some degree depending on the kind of the thermosetting resin used, it is preferred that the aqueous red phosphorus suspension contains 10 to 100 parts by weight of red phosphorus per 100 parts by weight of water, and the amount of the starting material for the resin or the precondensate to be added to the aqueous red phosphorus suspension is from 1 to 35 parts by weight per 100 parts by weight of the red phosphorus. In the case of using a starting material for the resin, it is preferred to conduct stirring at 40° to 100° C. for 1 to 3 hours. In the case of using a precondensate prepared beforehand, it is preferred to conduct stirring at 60° to 100° C. for 1 to 2 hours. The treated product thus obtained is separated from the mixture, washed with water, and dried at 130° to 140° C. to complete the polymerization reaction to thereby form a coating layer of a thermoset resin on the surfaces of the fine spherical red phosphorus particles.

This coating treatment may be conducted in the presence of a filler such as aluminum hydroxide, magnesium hydroxide, or titanium hydroxide. The amount of the filler to be added is preferably from 1 to 35 parts by weight per 100 parts by weight of the red phosphorus. The addition of such a filler is preferable in that it serves to improve the mechanical strength of the resinous coating layer and produce the effect of hiding the purplish red color characteristic of red phosphorus to thereby contribute to the expansion of the application of red phosphorus flame retardants.

The coating of the fine spherical red phosphorus particles with a thermosetting resin may be conducted either directly or after coating with any of the above-enumerated inorganic compounds.

It should however be noted that the coating with a thermosetting resin tends to impair advantages of the fine spherical red phosphorus particles to be coated, because the curing reaction of the resin proceeds in a heating/drying step after coating with the resin and, as a result, the resin-coated particles may be blocked, i.e., bonded to one another, to become coarser. For avoiding this blocking, it is necessary to heat and dry the resin-coated particles for a relatively long time with precise temperature regulation; however, this method is not efficient.

The present inventors attempted to avoid the blocking efficiently. As a result, we have found that by means of a post-treatment with an inorganic compound before heating and drying the resin coated particles, the blocking is prevented effectively and the size enlargement of the coated flame-retardant particles due to the coating is inhibited. By the post-treatment, a red phosphorus flame retardant in fine powder form having a narrow distribution of particle size can be produced extremely efficiently through considerably reduced steps. In this invention, the inorganic compound which is used for the post-treatment is referred to as "second inorganic compound."

The post-treatment in this invention means a treatment with an inorganic compound which can prevent the resin-coated particles from blocking. The post-treatment may be conducted as follows.

According to the above described method for coating with a thermosetting resin, the red phosphorus particles, which are coated or uncoated with a metal oxide, are suspended in water, coated with the thermosetting resin by adding resin materials to the suspension and stirring, and then the resulting product is filtrated and washed with water. The resulting product is then resuspended in water. An aqueous solution of a water-soluble salt of a metal is added to the suspension, and an inorganic compound is precipitated by neutralization or double decomposition and deposited on the resin-coated surfaces. The inorganic compound in this case is selected from the metal oxides or hydroxides of the Groups II, III, and IV of the Periodic Table. The post-treatment is also possible to deposit a sparingly water-soluble inorganic compound on the resin-coated surfaces by merely adding a fine powder of the compound to the above described aqueous suspension and stirring the resulting mixture. Examples of the inorganic compound in this case include silica, titanium dioxide, aluminum oxide, zinc oxide, magnesium oxide, magnesium carbonate, aluminum silicate, barium sulfate, calcium sulfate, calcium phosphate, apatite, talc, bentonite, kaolin, and diatomaceous earth. It is preferred to use such an inorganic compound as a fine powder having an average particle size of 1 μm or smaller. The amount of the inorganic compound to be deposited in the post-treatment should be at least 0.5 part by weight per 100 parts by weight of the red phosphorus, with the preferred range thereof being from 1.0 to 3.0 parts by weight. Amounts thereof below 0.5 part by weight are insufficient for blocking inhibition. On the other hand, even if the amount thereof is increased to above 3.0 parts by weight, the blocking-inhibiting effect does not change.

It has been ascertained that this red phosphorus flame retardant in fine powder form obtained from fine spherical red phosphorus particles has far higher stability than finely powdered flame retardants obtained from finely pulverized red phosphorus. (See Table 1.)

A nonflammable resinous composition produced by incorporating this red phosphorus flame retardant in fine powder form into a synthetic resin is also included in the present invention. It is known that decomposition products resulting from the disproportionation reaction of red phosphorus denature resins to adversely affect the resin properties. However, it has been found that the decrease in resin properties due to red phosphorus can be diminished in resin compositions containing the red phosphorus flame retardant of this invention. (See Table 2.)

Examples of the synthetic resin into which the red phosphorus flame retardant of this invention can be incorporated include polyolefin resins, polystyrene, poly(p-xylylene), poly(vinyl acetate), polyacrylates, polymethacrylates, polyethers, polycarbonates, thermoplastic polyesters, polyamides, polyurethanes, phenolic resins, furan resins, xylene-formaldehyde resins, ketone-formaldehyde resins, urea resins, melamine resins, aniline resins, alkyd resins, unsaturated polyester resins, and epoxy resins. The amount of the red phosphorus flame retardant to be incorporated varies depending on the kind of the synthetic resin, but is preferably from 0.1 to 30 parts by weight per 100 parts by weight of the resin. Amounts thereof below 0.1 part by weight are undesirable in that sufficient flame retardancy is not obtained, while amounts thereof above 30 parts by weight are undesirable because the resin properties are affected. If desired and necessary, known additives may be further incorporated such as, e.g., a filler, a stabilizer, a plasticizer, a colorant, a fibrous glass, and a lubricant.

EXAMPLES

The invention will be more clearly understood with reference to the following non-limiting examples.

Production Example A for Fine Spherical Red Phosphorus Particles

Into an iron reactor (inner diameter, 155 mm; height, 130 mm) equipped with a condenser was introduced 1,000 ml of warm water having a temperature of about 60° C., followed by 980 g of molten white phosphorus and 1.0 g of an alkylol amide (Homelead CD, manufactured by Lion Corp., Japan), a nonionic surfactant, as a dispersant. Nitrogen gas was then passed through the reactor, and the reactor was heated to remove the water by evaporation at around 100° C. The heating of the resulting contents was continued at about 280° C. for 4 hours while the white phosphorus was kept being refluxed to the reactor. After most of the unconverted white phosphorus was then distilled off, the contents were heated to more than 280° C. and heating was continued at a temperature not higher than 330° C. for 4 hours to remove the white phosphorus remaining in a slight amount, subsequently allowed to cool, and then taken out of the reactor. Thus, 195 g of fine spherical red phosphorus particles having an average particle size of 2.7 μm were obtained.

EXAMPLE 1

250 Grams of the red phosphorus obtained in Production Example A given above was added to 1000 ml of water, and the resulting solution was stirred thoroughly, and then filtrated to remove the dispersant from the red phosphorus. The thus-obtained red phosphorus was again suspended in water to give 1,000 ml of a suspension. Thereto were added 44 g of 27% aqueous aluminum sulfate solution and 92 g of 18% aqueous ammonium bicarbonate solution. The pH of this suspension was adjusted to 7.5 with ammonia water, and the resulting suspension was heated to 90° C. and maintained at this temperature for 1 hour to coat the red phosphorus particles with aluminum hydroxide. After cooling, the red phosphorus particles were recovered by filtration and resuspended in water. The pH of this suspension was adjusted to 10.0 with ammonia water, following which 50 g of a resol-type phenolic resin (FORASITE TD-2388, manufactured by Dainippon Ink & Chemicals, Incorporated, Japan) was added. Thereto were then added 36 g of 18% aqueous hydrogen chloride solution and 7.7 g of ammonium chloride. This mixture was stirred at 90° C. for 1 hour. After cooling, the resulting red phosphorus product was recovered by filtration, washed with water, and then dried at 130° C. in a nitrogen gas stream to thereby obtain 265 g of a coated red phosphorus.

EXAMPLE 2

250 Grams of the red phosphorus obtained in Production Example A given above was added to 1000 ml of water, and the resulting solution was stirred thoroughly, and then filtrated to remove the dispersant from the red phosphorus. The thus-obtained red phosphorus was again suspended in water to give 1,000 ml of a suspension. Thereto was added 30 g of 30% aqueous titanium sulfate solution. The resulting suspension was heated to 90° C. and maintained at this temperature for 1 hour. The pH of the suspension was adjusted to 7.5 with 24% aqueous sodium hydroxide solution to coat the red phosphorus particles with a titanium compound based on hydrolysis. After cooling, the red phosphorus product was recovered by filtration and resuspended in water. The pH of this suspension was adjusted to 10.0 with ammonia water, following which 50 g of a resol-type phenolic resin (FORASITE TD-2388) was added. Thereto were then added 18 g of 18% aqueous hydrogen chloride solution and 3.8 g of ammonium chloride. This mixture was stirred at 90° C. for 1 hour. The resulting red phosphorus product was recovered by filtration and resuspended in water to give 1,000 ml of a suspension. Thereto was added 30 g of 30% aqueous titanium sulfate solution. This mixture was heated to 90° C. and maintained at this temperature for 1 hour. The pH of the resulting mixture was then adjusted to 7.5 with 24% aqueous sodium hydroxide solution, and the mixture was stirred for 30 minutes. The resulting red phosphorus product was recovered by filtration, washed with water, and then dried at 140° C. in a nitrogen gas stream to thereby obtain 267 g of a coated red phosphorus.

EXAMPLE 3

100 Grams of the red phosphorus obtained in Production Example A given above was added to 300 ml of water, and the resulting solution was stirred thoroughly, and then filtrated to remove the dispersant from the red phosphorus. The thus-obtained red phosphorus was again suspended in 300 ml of water. The suspension was heated to 50° C. Thereto were added 18 g of 27% aqueous aluminum sulfate solution and 37 g of 18% aqueous ammonium bicarbonate solution. The pH of this suspension was adjusted to 7.5 with ammonia water, and the resulting suspension was heated to 90° C. and maintained at this temperature for 1 hour. After cooling, the red phosphorus product was recovered by filtration and resuspended in water. To this suspension was dropwise added 200 g of an aqueous emulsion containing 10 g of an epoxy resin (Epikote 828, manufactured by Yuka Shell Epoxy K.K., Japan), 4 g of a hardener (ADEKA Hardener EH-227, manufactured by Asahi Denka Kogyo K.K., Japan), and 2 g of sorbitol monostearate. This mixture was maintained at 40° C. for 7 hours. The resulting red phosphorus product was recovered by filtration, washed with water, and then dried at 130° C. in a nitrogen gas stream to thereby obtain 113 g of a coated red phosphorus.

EXAMPLE 4

100 Grams of the red phosphorus obtained in Production Example A given above was treated in the same manner as in Example 3 except that the drying at 130° C. was omitted. The resulting red phosphorus product was recovered by filtration and resuspended in 300 g of water. This suspension was heated to 50° C., and 18 g of 27% aqueous aluminum sulfate solution was then added thereto. The resulting suspension was sufficiently stirred. Thereto was dropwise added 37 g of 18% aqueous ammonium bicarbonate solution. The pH of the suspension was then adjusted to 7.5 with ammonia water, and this suspension was heated to 90° C. and maintained at this temperature for 1 hour. After cooling, the resulting red phosphorus product was recovered by filtration, washed with water, and then dried at 130° C. in a nitrogen gas stream to thereby obtain 115 g of a coated red phosphorus.

Production Example B for Fine Spherical Red Phosphorus Particles

The same conversion reaction as in Production Example A for Fine Spherical Red Phosphorus Particles given hereinabove was conducted except that 4.9 g of oleamide was used as the dispersant and that the time for heating at about 280° C. was changed to 8 hours. Thus, 310 g of fine spherical red phosphorus product having an average particle size of 9.6 μm was obtained.

EXAMPLE 5

500 Grams of the red phosphorus obtained in Production Example B given above was added to 1500 ml of water, and the resulting solution was stirred thoroughly, and then filtrated to remove the dispersant from the red phosphorus. The thus-obtained red phosphorus was again suspended in 1500 ml of water. Thereto was added 300 ml of 20% aqueous zinc chloride solution. Thereto was dropwise added 400 ml of 10% aqueous sodium hydroxide solution with sufficient stirring. This mixture was heated to 50° C. and maintained at this temperature for 30 minutes. After cooling, the resulting red phosphorus product was recovered by filtration, washed with water, and then dried at 120° C. in a nitrogen gas stream to thereby obtain 540 g of a coated red phosphorus.

EXAMPLE 6

500 Grams of red phosphorus obtained in Production Example B given above was added to 1500 ml of water, and the resulting solution was stirred thoroughly, and then filtrated to remove the dispersant from the red phosphorus. The thus-obtained red phosphorus was again suspended in 1500 ml of water, and 50 g of magnesium hydroxide was added thereto to obtain a suspension. To the suspension were added 6 g of melamine, 28 g of 37% formalin, and 10 g of sodium carbonate. This mixture was stirred at 90° C. for 2 hours to react the reactants. After the mixture was then allowed to cool for a whole day and night, the resulting red phosphorus product was recovered by filtration, washed with water, and then dried at 135° C. in a nitrogen gas stream to thereby obtain 555 g of a coated red phosphorus.

Production Example for Finely Pulverized Red Phosphorus

A 20% aqueous suspension of commercially available red phosphorus was subjected to pulverizing in a ball mill for 3 hours. The resulting red phosphorus product was wet-classified with a 300-mesh screen to obtain finely pulverized red phosphorus particles having an average particle size of 10.9 μm.

COMPARATIVE EXAMPLE 1

The finely pulverized red phosphorus particles were treated in the same manner as in Example 1 to obtain a coated red phosphorus.

COMPARATIVE EXAMPLE 2

250 Grams of the finely pulverized red phosphorus particles were suspended in water to give 1,000 ml of a suspension. Thereto was added 30 g of 30% aqueous titanium sulfate solution. The resulting suspension was heated to 90° C. and maintained at this temperature for 1 hour. The pH of the suspension was then adjusted to 7.5 with 24% aqueous sodium hydroxide solution, and this suspension was stirred for 30 minutes. The resulting red phosphorus product was recovered by filtration, washed with water, and then dried at 130° C. in a nitrogen gas stream to thereby obtain 253 g of a coated red phosphorus.

Comparative Example for Production of Spherical Red Phosphorus Particles

The same conversion reaction as in Production Example A given hereinabove was conducted except that the dispersant was omitted and that the time for heating at about 280° C. was changed to 8 hours. The thus-obtained soft mass of red phosphorus was powdered by hand. Thus, 338 g of spherical red phosphorus particles having an average particle size of 30.7 μm were obtained.

COMPARATIVE EXAMPLE 3

250 Grams of the red phosphorus obtained in Comparative Example for Production of Spherical Red Phosphorus Particles given above was suspended in water to give 1,000 ml of a suspension. Thereto were added 164 g of 27% aqueous aluminum sulfate solution and 119 g of 18% aqueous ammonium bicarbonate solution. The pH of this suspension was adjusted to 7.5 with ammonia water, and the resulting suspension was heated to 90° C. and maintained at this temperature for 1 hour to coat the red phosphorus product with aluminum hydroxide. After cooling, the red phosphorus product was recovered by filtration and resuspended in water. The pH of this suspension was adjusted to 10.0 with ammonia water, following which 75 g of a resol-type phenolic resin (FORASITE TD-2388) was added. Thereto were then added 14 g of 35% aqueous hydrogen chloride solution and 5.8 g of ammonium chloride. This mixture was stirred at 90° C. for 1 hour. After cooling, the resulting red phosphorus product was recovered by filtration, washed with water, and then dried at 130° C. in a nitrogen gas stream to thereby obtain 269 g of a coated red phosphorus.

In Examples 1 to 6 and Comparative Examples 1 to 3, the "average particle size" and "cumulative volume percentage of 20 μm and smaller particles" for each of the uncoated red phosphorus were measured, and the "average particle size", "cumulative volume percentage of 35 μm and smaller particles", and "generated phosphine amounts A and B" for each of the coated red phosphorus flame retardants obtained were also determined. The results obtained are summarized in Table 1.

LAR® Bag, manufactured Du Pont Ltd., U.S.A.) was airtightly attached to one of the glass tubes at its end to be located inside the flask. This flask was allowed to stand in a 65° C. thermostatic chamber for 24 hours and the phosphine gas generated during that period was held in the flask. The resulting flask was allowed to stand at room temperature for 30 minutes. The cock of the glass tube to which the PVF film bag had been attached was then opened to take a 100 ml portion of the gas with a syringe through the other glass tube, and its phosphine concentration was measured with the hydrogen phosphide detector tube. From the capacity of the flask, the amount of the phosphine generated per g of the red phosphorus was calculated.

TABLE 1

Particle size distribution and generated phosphine amount for coated red phosphorus flame retardants

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Uncoated Red Phosphorus: | | | | | | | | | |
| V (μm) | 2.7 | 2.7 | 2.7 | 2.7 | 9.6 | 9.6 | 10.9 | 10.9 | 30.7 |
| W (%) | 98 | 98 | 98 | 98 | 95 | 95 | 77 | 77 | 24 |
| Coated Flame Retardant: | | | | | | | | | |
| X (μm) | 8.9 | 4.1 | 11.1 | 4.4 | 9.9 | 13.3 | 14.6 | 10.7 | 33.2 |
| Y (%) | 85 | 95 | 89 | 98 | 93 | 91 | 82 | 83 | 53 |
| Z (μm/g) | | | | | | | | | |
| A | 20 | 25 | 44 | 37 | 51 | 22 | 300 | 910 | 44 |
| B | 14 | 16 | 6.2 | 4.5 | 18 | 4.0 | 44 | 52 | 1.4 |

Notes:
V = average particle size of uncoated red phosphorus,
W = cumulative volume percentage of 20 μm and smaller particles,
X = average particle size of coated flame retardant,
Y = cumulative volume percentage of 35 μm and smaller particles,
Z = generated phosphine amounts The "average particle size", "cumulative volume percentage", and "generated phosphine amounts A and B" in Table 1 were determined as follows.
Average Particle Size and Cumulative Volume Percentage Measurements were made with a granulometer (Model 715, manufactured by CILAS ALCATEL, France).
Generated Phosphine Amount A
Ten grams of a sample was placed in a 300-ml Erlenmeyer flask, which was then sealed with a plug having two glass tubes. One of the glass tubes was connected to a nitrogen gas container and the other to a gas collector vessel. Nitrogen gas was introduced into the flask at a rate of 2 l/hr for 1 hour. While nitrogen gas was kept being further introduced into the flask at that rate, the flask was immersed for 3 hours in an oil bath having a temperature of 250° C. and the gas generated during that period was collected. A 100 ml portion was taken from the collected gas with a syringe, and its phosphine concentration was measured with a hydrogen phosphide detector tube (manufactured by Komyo Rikagaku Kogyo K.K., Japan). From the volume of the whole generated gas, the amount of the phosphine generated per g of the red phosphorus was calculated.
Generated Phosphine Amount B
Ten grams of a sample was placed in a 300-ml Erlenmeyer flask. The flask was then sealed with a plug having two glass tubes each having a cock, after a gauze impregnated with water was placed in the flask so as not to be in contact with the sample and a PVF (polyvinyl fluoride) film bag (TED- The data given in Table 1 show that there are considerable differences in stability and particle fineness between the flame retardants according to the invention and the conventional flame retardants. The flame retardants of Examples 1 to 6, which employed fine spherical red phosphorus particles as a flameproofing ingredient, generated significantly smaller amounts of phosphine than the flame retardants of Comparative Examples 1 and 2, although the former flame retardants did not greatly differ in particle fineness from the latter ones. The flame retardants of Examples 1 to 6 are almost equal in stability to the flame retardant of Comparative Example 3 as apparent from the generated phosphine amounts, but the former flame retardants are finer than the latter one.

Table 1 further shows that the flame retardants of Examples 2 and 4, which underwent the post-treatment with an inorganic compound after the coating of the fine spherical red phosphorus particles with a thermosetting resin, have smaller average particle sizes than the flame retardants of Examples 1 and 3, which did not undergo the post-treatment (post-coating).

EXAMPLE 7

The red phosphorus flame retardant obtained in Example 1 was mixed with polystyrene (DIAREX HT-88, manufactured by Mitsubishi Monsanto Chemical Company, Japan) in such an amount as to result in a red phosphorus content of 10% by weight. The mixture was kneaded with an extruder. The pellets obtained were injection-molded into test pieces each 60 mm long, 30 mm wide, and 4 mm thick.

EXAMPLE 8

Using the red phosphorus flame retardant obtained in Example 4, a resin composition was prepared in the same manner as in Example 7.

COMPARATIVE EXAMPLE 4

Using the red phosphorus flame retardant obtained in Comparative Example 1, a resin composition was prepared in the same manner as in Example 7.

EXAMPLE 9

The red phosphorus flame retardant obtained in Example 2 was mixed with nylon 6 (CM-1007, manufactured by Toray Industries, Inc., Japan) in such an amount as to result in a red phosphorus content of 5% by weight. The mixture was kneaded with an extruder. The pellets obtained were injection-molded into test pieces each 60 mm long, 30 mm wide, and 4 mm thick.

COMPARATIVE EXAMPLE 5

Using the red phosphorus flame retardant obtained in Comparative Example 1, a resin composition was prepared in the same manner as in Example 9.

EXAMPLE 10

Ten parts by weight, in terms of red phosphorus amount, of the red phosphorus flame retardant obtained in Example 6 was mixed with 100 parts by weight of an epoxy resin mix (Asahitite EX-17 and hardener EX 17ADD, manufactured by Asahi Research Laboratory, Japan) and 100 parts by weight of aluminum hydroxide (Higilite H-32, manufactured by Showa Denko K.K., Japan). The mixture was kneaded, degassed in a vacuum, subsequently injected into molds, and then heat-cured at 150° C. for 1 hour to produce test pieces each 100 mm long, 100 mm wide, and 2 mm thick and test pieces each 60 mm long, 30 mm wide, and 4 mm thick.

COMPARATIVE EXAMPLE 6

Using the red phosphorus flame retardant obtained in Comparative Example 1, a resin composition was prepared in the same manner as in Example 10.

The resin compositions obtained in Examples 7 to 10 and Comparative Examples 4 to 6 were tested. The results obtained are summarized in Table 2.

TABLE 2

| | Test results for resin compositions | | | | | | |
| --- | --- | --- | --- | --- | --- | --- | --- |
| | Ex. 7 | Ex. 8 | Ex. 9 | Ex. 10 | Comp. Ex. 4 | Comp. Ex. 5 | Comp. Ex. 6 |
| Water absorption (%) | 0.3 | 0.2 | 6.8 | 0.2 | 0.9 | 7.2 | 0.3 |
| Volume resistivity ($\Omega$cm) | $4.9 \times 10^{16}$ | $1.1 \times 10^{16}$ | $4.4 \times 10^{8}$ | $4.1 \times 10^{14}$ | $4.8 \times 10^{8}$ | $2.9 \times 10^{8}$ | $1.5 \times 10^{13}$ |
| Blisters (number per test piece) | 20 | 11 | 8 | — | $\geq 80$ | 8 | — |
| Electrical conductivity ($\mu$S/cm) | 4.33 | 6.09 | 22.9 | — | 4.35 | 30.6 | — |
| Generated phosphine amount A ($\mu$g/g) | 45 | 58 | 130 | 52 | 380 | 4700 | 1200 |

The "water absorption", "volume resistivity", "blisters", "electrical conductivity", and "generated phosphine amount A" in Table 2 were determined as follows.

Water Absorption

A test piece 60 mm long, 30 mm wide, and 4 mm thick was placed for 28 days in a thermo-hygrostatic chamber regulated to have a temperature of 65° C. and a relative humidity of 95%. The test piece was then immersed in 23° C. distilled water in a vessel for 1 hour, taken out therefrom, and wiped with a dry clean gauze. The resulting test piece was weighed to calculate the percentage of weight increase.

Volume Resistivity

A test piece was placed for 60 hours in a thermo-hygrostatic chamber regulated to have a temperature of 65° C. and a relative humidity of 95%, and its volume resistivity was then measured in accordance with JIS K 6911. For Examples 7 to 9 and Comparative Examples 4 and 5, the test pieces 60 mm long, 30 mm wide, and 4 mm thick were examined using a main electrode with an outer diameter of 10 mm and a guard electrode with an inner diameter of 20 mm. For Example 10 and Comparative Example 6, the test pieces 100 mm long, 100 mm wide, and 2 mm thick were examined using a main electrode with an outer diameter of 50 mm and a guard electrode with an inner diameter of 70 mm.

Blisters

A test piece 60 mm long, 30 mm wide, and 4 mm thick was placed for 28 days in a thermo-hygrostatic chamber regulated to have a temperature of 65° C. and a relative humidity of 95%, and the blisters which had appeared on both sides of the test piece were visually counted.

Electrical Conductivity

A test piece 60 mm long, 30 mm wide, and 4 mm thick was immersed in 100 g of distilled water contained in a 100-ml polyethylene bottle. This bottle was capped and then placed in a 80° C. thermostatic chamber for 60 hours. The electrical conductivity of the resulting water was measured.

Generated Phosphine Amount A

Measurement was made in the same manner as Method for Determining Generated Phosphine Amount A in Table 1 except that the test pieces 60 mm long, 30 mm wide, and 4 mm thick were examined.

The results in Table 2 show that there are considerable differences in moisture resistance between the resin compositions of Examples 7 to 10, which contain a red phosphorus flame retardant in the form of fine spherical particles, and the resin compositions of Comparative Examples 4 to 6, which contain a red phosphorus flame retardant in the form of fine pulverized particles.

While the invention has been described in detail and with reference to specific embodiments thereof, it will be apparent to one skilled in the art that various changes and modifications can be made therein without departing from the spirit and scope thereof.

What is claimed is:

1. A fine red phosphorus flame retardant, comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups II to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particle size of 10 μm or smaller and at least 80% by weight of said spherical red phosphorus particles have particle sizes of 20 μm or smaller, and said fine flame retardant has an average particle size of 15 μm or smaller and at least 80% by weight of said fine flame retardant has a particle size of 35 μm or smaller.

2. A fine red phosphorus flame retardant as claimed in claim 1, wherein said surface modification treatment comprises coating said spherical red phosphorus particles and/or agglomerates thereof with a thermosetting resin, followed by a post-treatment with a second inorganic compound.

3. A nonflammable resinous composition, comprising a synthetic resin and a fine red phosphorus flame retardant, said fine flame retardant comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups II to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particle size of 10 μm or smaller and at least 80% by weight of said spherical red phosphorus particles have particle sizes of 20 μm or smaller, and said fine flame retardant has an average particle size of 15 μm or smaller and at least 80% by weight of said fine flame retardant has a particle size of 35 μm or smaller.

4. A fine red phosphorus flame retardant as claimed in claim 1, wherein said thermal conversion reaction proceeds in the presence of from 0.01 to 5% by weight of said dispersant based on the amount of the white phosphorus.

5. A fine red phosphorus flame retardant as claimed in claim 1, wherein said inorganic compound is selected from the group consisting of aluminum hydroxide, magnesium hydroxide, zinc hydroxide and titanium oxide.

6. A fine red phosphorus flame retardant as claimed in claim 1, wherein said thermosetting resin is selected from the group consisting of a phenolic resin, a furan resin, a xylene-formaldehyde resin, a ketone-formaldehyde resin, an urea resin, a melamine resin, an aniline resin, an alkyd resin, an unsaturated polyester resin and an epoxy resin.

7. A nonflammable resinous composition as claimed in claim 3, wherein said synthetic resin is selected from the group consisting of a polyolefin resin, a polystyrene, a poly(p-xylylene), a poly(vinyl acetate), a polyacrylate, a polymethacrylate, a polyether, a polycarbonate, a thermoplastic polyester, a polyamide, a polyurethane, a phenolic resin, a furan resin, a xylene-formaldehyde resin, a ketone-formaldehyde resin, an urea resin, a melamine resin, an aniline resin, an alkyd resin, an unsaturated polyester resin, and an epoxy resin.

8. A nonflammable resinous composition as claimed in claim 3, wherein said thermal conversion reaction proceeds in the presence of from 0.01 to 5% by weight of said dispersant based on the amount of the white phosphorus.

9. A nonflammable resinous composition as claimed in claim 3, wherein said inorganic compound is selected from the group consisting of aluminum hydroxide, magnesium hydroxide, zinc hydroxide and titanium oxide.

10. A nonflammable resinous composition as claimed in claim 3, where said thermosetting resin is selected from the group consisting of a phenolic resin, a furan resin, a xylene-formaldehyde resin, a ketone-formaldehyde resin, an urea resin, a melamine resin, an aniline resin, an alkyd resin, an unsaturated polyester resin and an epoxy resin.

11. A fine red phosphorus flame retardant, comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups IV to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particle size of 10 μm or smaller and at least 80% by weight of said spherical red phosphorus particles have particle sizes of 20 μm or smaller, and said fine flame retardant does not generate more than 100 μg of phosphine per gram under heating at 250° C. for 3 hours.

12. A fine red phosphorus flame retardant as claimed in claim 11, wherein said surface modification treatment comprises coating said spherical red phosphorus particles and/or agglomerates thereof with a thermosetting resin, followed by a post-treatment with a second inorganic compound.

13. A nonflammable resinous composition, comprising a synthetic resin and a fine red phosphorus flame retardant, said fine flame retardant comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups II to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particle size of 10 μm or smaller and at least 80% by weight of said spherical red phosphorus particles have particle sizes of 20 μm or smaller, and said fine flame retardant does not generate more than 100 μg of phosphine per gram under heating at 250° C. for 3 hours.

14. A fine red phosphorus flame retardant, comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups II to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particle size of 10 μm or smaller and at least 80% by weight of said spherical red phosphorus particles have particle sizes of 20 μm or smaller, and said fine flame retardant has an average particle size of 15 μm or smaller, at least 80% by weight of said fine flame retardant has a particle size of 35 μm or smaller, and said fine flame retardant does not generate more than 100 μg of phosphine per gram under heating at 250° C. for 3 hours.

15. A nonflammable resinous composition, comprising a synthetic resin and a fine red phosphorus flame retardant, said fine flame retardant comprising a fine red phosphorus powder subjected to a surface modification treatment comprising coating said spherical red phosphorus particles and/or agglomerates thereof with an inorganic compound selected from the metal oxides or hydroxides of the Groups II to IVA or Groups II to IVB of the Periodic Table and/or a thermosetting resin, said fine red phosphorus powder consisting of spherical red phosphorus particles and/or agglomerates thereof directly obtained by thermal conversion of white phosphorus in the presence of a dispersant selected from the group consisting of a surfactant, an inorganic ammonium salt and an organic compound containing an amino group, wherein said spherical red phosphorus particles have an average particles size of 10 μm or smaller and at least 80% by weight of said spherical red phosphorus particles have particle sizes of 20 μm or smaller, and said fine flame retardant has an average particle size of 15 μm or smaller, at least 80% by weight of said fine flame retardant has a particle size of 35 μm or smaller, and said fine flame retardant does not generate more than 100 μg of phosphine per gram under heating at 250° C. for 3 hours.

16. A method of preventing thermosetting resin coated red phosphorus particles from forming coarse particles during heat curing by bonding, comprising coating red phosphorus with a thermosetting resin and subsequently with a second inorganic compound, filtering, water-washing, and drying to prevent said particles from bonding to one another, said inorganic compound being selected from the group consisting of silica, titanium dioxide, aluminum oxide, zinc oxide, magnesium oxide, magnesium carbonate, aluminum silicate, barium sulfate, calcium sulfate, calcium phosphate, apatite, talc, bentonite, kaolin and diatomaceous earth.

17. A fine red phosphorus flame retardant as claimed in claim 14, wherein said surface modification treatment comprises coating said spherical red phosphorus particles and/or agglomerates thereof with a thermosetting resin, followed by a post-treatment with a second inorganic compound.

\* \* \* \* \*

UNITED STATES PATENT AND TRADEMARK OFFICE
CERTIFICATE OF CORRECTION

PATENT NO. : 5,543,444
DATED : August 6, 1996
INVENTOR(S) : Kobayashi

It is certified that error appears in the above-indentified patent and that said Letters Patent is hereby corrected as shown below:

Column 5, lines 53-54, delete in their entirety and substitute therefor:

--Production Example A for Fine Spherical
  Red Phosphorus Particles--.

Column 7, lines 39-40, delete in their entirety and substitute therefor:

--Production Example B for Fine Spherical
  Red Phosphorus Particles--.

Column 8, line 13, delete in its entirety and substitute therefor:

--Production Example for Finely Pulverized
  Red Phosphorus--.

Column 8, lines 39-40, delete in their entirety and substitute therefor:

--Comparative Example for Production of Spherical
  Red Phosphorus Particles--.

UNITED STATES PATENT AND TRADEMARK OFFICE
CERTIFICATE OF CORRECTION

PATENT NO. : 5,543,444
DATED : August 6, 1996
INVENTOR(S) : Kobayashi

It is certified that error appears in the above-indentified patent and that said Letters Patent is hereby corrected as shown below:

Column 9, line 51, delete "2 1/hr" and substitute therefor --2 ℓ/hr--; and delete Table 1 and substitute therefor the following table:

TABLE 1

| | Particle size distribution and generated phosphine amount for coated red phosphorus flame retardants | | | | | | | | |
|---|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 | Comp. Ex. 3 |
| Uncoated Red Phosphorus: | | | | | | | | | |
| V ($\mu$m) | 2.7 | 2.7 | 2.7 | 2.7 | 9.6 | 9.6 | 10.9 | 10.9 | 30.7 |
| W (%) | 98 | 98 | 98 | 98 | 95 | 95 | 77 | 77 | 24 |
| Coated Flame Retardant: | | | | | | | | | |
| X ($\mu$m) | 8.9 | 4.1 | 11.1 | 4.4 | 9.9 | 13.3 | 14.6 | 10.7 | 33.2 |
| Y (%) | 85 | 95 | 89 | 98 | 93 | 91 | 82 | 83 | 53 |
| Z ($\mu$g/g) | | | | | | | | | |
| A | 20 | 25 | 44 | 37 | 51 | 22 | 300 | 910 | 44 |
| B | 14 | 16 | 6.2 | 4.5 | 18 | 4.0 | 44 | 52 | 1.4 |

Notes:
V = average particle size of uncoated red phosphorus.
W = cumulative volume percentage of 20 $\mu$m and smaller particles.
X = average particle size of coated flame retardant.
Y = cumulative volume percentage of 35 $\mu$m and smaller particles.
Z = generated phosphine amounts Column 13, line 21, delete "said";
line 26, after "of" insert --said--;
line 47, delete "said"; and
line 52, after "of" insert --said--.

UNITED STATES PATENT AND TRADEMARK OFFICE
CERTIFICATE OF CORRECTION

PATENT NO. : 5,543,444
DATED : August 6, 1996
INVENTOR(S) : Kobayashi

It is certified that error appears in the above-indentified patent and that said Letters Patent is hereby corrected as shown below:

Column 14, line 37, delete "said";
        line 40, delete "IV" and substitute therefor --II--;
        line 42, after "of" insert --said--; and
        line 63, delete "said".

Column 15, line 1, after "of" insert --said--;
        line 14, delete "said";
        line 19, after "of" insert --said--; and
        line 37, delete "said".

Column 16, line 5, after "of" insert --said--.

Signed and Sealed this

Twenty-sixth Day of August, 1997

Attest:

BRUCE LEHMAN

Attesting Officer      Commissioner of Patents and Trademarks